United States Patent [19]

Sklar

[11] Patent Number: 5,577,750
[45] Date of Patent: *Nov. 26, 1996

[54] BICYCLE STABILIZING FLEXPOLE TRAINER

[76] Inventor: Lyle W. Sklar, 4210 NW 26th Ct., Boca Raton, Fla. 33434

[*] Notice: The terminal 10 months of this patent has been disclaimed.

[21] Appl. No.: 272,663

[22] Filed: Jul. 11, 1994

Related U.S. Application Data

[63] Continuation of Ser. No. 43,896, Apr. 7, 1993, abandoned.

[51] Int. Cl.⁶ ................................................ B62H 7/00
[52] U.S. Cl. ................................ 280/293; 280/288.4
[58] Field of Search ............................... 280/293, 294, 280/296, 298, 288.4, 292, 295, 47.131, 755, 213; 403/373, 399, 379, 200

[56] References Cited

U.S. PATENT DOCUMENTS

| | | | |
|---|---|---|---|
| 582,070 | 5/1897 | Lester | 280/288.4 |
| 1,618,974 | 3/1927 | Cahusac | 403/200 X |
| 2,672,351 | 3/1954 | Kane | 280/288.4 |
| 2,816,775 | 12/1957 | Costello | 280/288.4 |
| 3,595,599 | 7/1971 | Black | 280/282 |
| 3,650,544 | 3/1972 | Cassell | 280/293 |
| 4,130,138 | 12/1978 | Swanstrom | 403/200 X |
| 4,174,911 | 11/1979 | Maccario et al. | 403/373 X |
| 4,575,189 | 3/1986 | Johnson | 280/288.4 |
| 4,917,398 | 4/1990 | deMiranda Pinto | 280/298 X |
| 5,028,066 | 7/1991 | Garth | 280/293 X |
| 5,154,096 | 10/1992 | Geller et al. | 280/293 X |
| 5,236,215 | 8/1793 | Wylie | 280/507 X |
| 5,259,638 | 11/1993 | Krauss et al. | 280/293 |

FOREIGN PATENT DOCUMENTS 0090082 of 1957 Germany ............................. 403/200

*Primary Examiner*—Anne Marie Boehler
*Attorney, Agent, or Firm*—Oltman, Flynn & Kubler

[57] ABSTRACT

A bicycle stabilizing flexpole trainer, removable attachable to the rear of a bicycle frame, adjacent its center of gravity. The trainer defines an elongated flexible tubular balancing pole having a free upper end, an intermediate section and a reinforced anchor engageable lower end. An adjustable pole anchor clamp and connector plate to secure the end of the pole to the frame of the bicycle. The clamp forms opposed plates, engaging the frame in compression contact. The clamp upper plate includes legs extending downwardly of the clamping assembly to confine the lower plate against displacement.

1 Claim, 2 Drawing Sheets

5,577,750

BICYCLE STABILIZING FLEXPOLE TRAINER

This application is a continuation of application Ser. No. 08/043,896, filed Apr. 7, 1993 now abandoned.

BACKGROUND OF THE INVENTION

Up to the present, to support the novice, trainee bike rider, the adult had to grip onto either the seat of the child or the seat of the bike. Often he/she must have another hand on the handle bar to help steer. This may lead to injury to both child and adult. More recently, children learning to ride bicycles have required addition to the bicycle of a set of training wheels, thus presenting support and stability to the vehicle when the novice is mounted; when training wheels are removed, problems develop for the adult who is assisting in the learning process. This abnormal bending position which the adult assumes while guiding and running along, supporting the child can lead to back strain. Also, the rear bike wheel often presents a stumbling block. It is ideal for the adult to balance the bike while located directly behind it, so as to be in perfect position to react if the bike begins to lean uncontrollably to the left or the right. The present invention eliminates bending and provides a stable support which the adult can grip to stabilize the bicycle and child while positioning the adult behind the child and rear wheel. Also, when the adult is behind the bike, the height of the present pole with the guiding grip at the top visually amplifies any erratic tilting motions of the child or the bike and one can thus anticipate the need to grab on or get a better grip on the pole, quickly before the child completely loses balance. Accordingly, the present invention provides an alternative that is not currently available when one makes the decision to remove a child's training wheels. Installation and removal of the pole is by hand tightening and loosening; no tools being required. The vice-like clamp is easily removed with pliers or wrench to loosen a simple nut.

The present invention provides a most convenient transition from bicycle training wheels. A custom retrofitted extension pole is used by the adult to balance the bicycle. It is secured to the upper rear wheel fork by a readily detachable mount. This innovation thus provides a simple, inexpensive and removable or replaceable stabilizing unit. As a so-called BIKE STICK (™), it is a uniquely mounted extension pole, manually engaged by an adult to balance a bicycle while a child learns to ride, without training wheels. Whereas, the adult using the BIKE STICK (™) avoids bending over and back strain; the invention it helps an adult assist a child in developing balance, confidence, the ability to lean into turns, and achieve speed control. Falls, collisions, injuries and fear can all be reduced when learning to ride a bike with this balance BIKE STICK. (™).

THE PRIOR ART

The most notable earlier developments herein are represented by the following United States Letters Patent:

| INVENTOR | DATE | U.S. Pat. No. | TITLE |
| --- | --- | --- | --- |
| Kane | 1952 | 2,672,351 | HANDLE FOR PUSHING TRICYCLE |
| Cassell | 1972 | 3,650,544 | BICYCLE STABILIZER |
| De Miranda Pinto | 1990 | 4,917,398 | BICYCLE TRAINING HANDLE |

Each of the aforesaid, is deficient in terms of facility of installation and/or removal, and each is economically unfeasible, comparative to the present BIKE STICK (™) assembly.

SUMMARY OF INVENTION

In its broadest form, the invention comprises a removable and replaceable retrofitted training stabilizer for bicycles. The unit may likewise be adapted to related vehicles wherein balancing must be imposed adjacent the center of gravity of the vehicle; when the rider attempts to develop balance during propulsion of the unit, and even when it may be at a standstill. The conventional bicycle frame characteristically is in the form of an isosceles triangle from the forward apex of which depends a U-frame for the maneuverable front wheel and upon which is mounted a steering handlebar. From the rear apex and at the base of the frame are two fork supports which sustain the rear driving wheel in relation to the frame. The propulsion pedals and gears are conventionally located for interconnection with the driving wheel, etc. When occupied, the bicycle center of gravity, while shiftable, is generally located midway between front and rear wheels, in-line with the seatpost, perhaps more accurately stated to be at a vertical C/G line which is immediately forward of the rear driving wheel. Thus, the present stabilizer is set to complement the effect of the normal mounted center of gravity. This stabilizer is accordingly set adjacent the upper portion of the bicycle frame, close to the C/G and extends angularly upward therefrom, between the upper bifurcated rear wheel fork, close to the seatpost. It is fixed to the frame in an adjustable way so that it may accommodate bicycles having banana seats of various lengths and other configurations of the rear fork as will be more fully explained hereinafter.

Advantages achieved through the adaptation of invention include the following. The BIKE STICK (™) clamp comprises three plates all held together and secured to the bike by a single carriage bolt and nut. Stability of the three part clamp is enhanced by the vice-like clamping effect of anchor elements upon the upper rear fork of the frame. Installation and removal of the exterior pole onto the clamp requires no tools and involves only hand tightening of the pole. The exterior pole itself is secured to the clamp at its lower end by an axial bore contained in a solid rod-like insert that provides a threaded seat for an anchor bolt. The pole and insert, thus tighten onto a non-rotating carriage bolt. The position of the anchorage of the pole is between the front and rear wheels, close to the seat tube which is very close to the bicycle center of gravity. The pole position and angle permits the trainer to be positioned directly behind the bike. The flexibility of the pole itself is such that it allows the child rider limited freedom of motion to balance, without the adult user giving up his/her grip on the pole. The pole insert also provides rigidity to the flexible pole adjacent the critical area of anchorage to the clamp.

DESCRIPTION OF PREFERRED EMBODIMENTS

Figure 1:
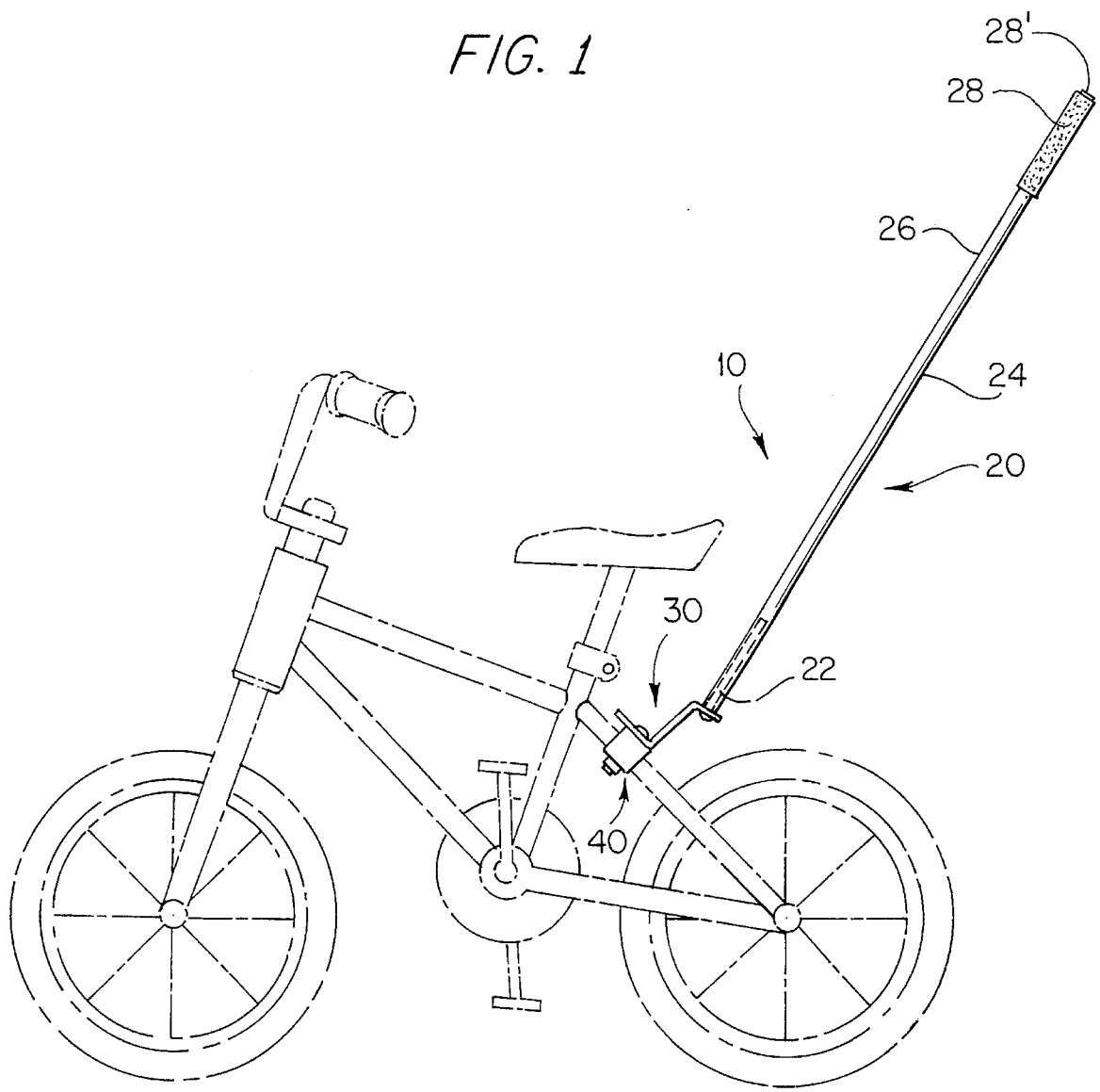
FIG. 1 is a view in side elevation of the invention unit, wherein the vehicle is at rest and balanced.
Figure 2:
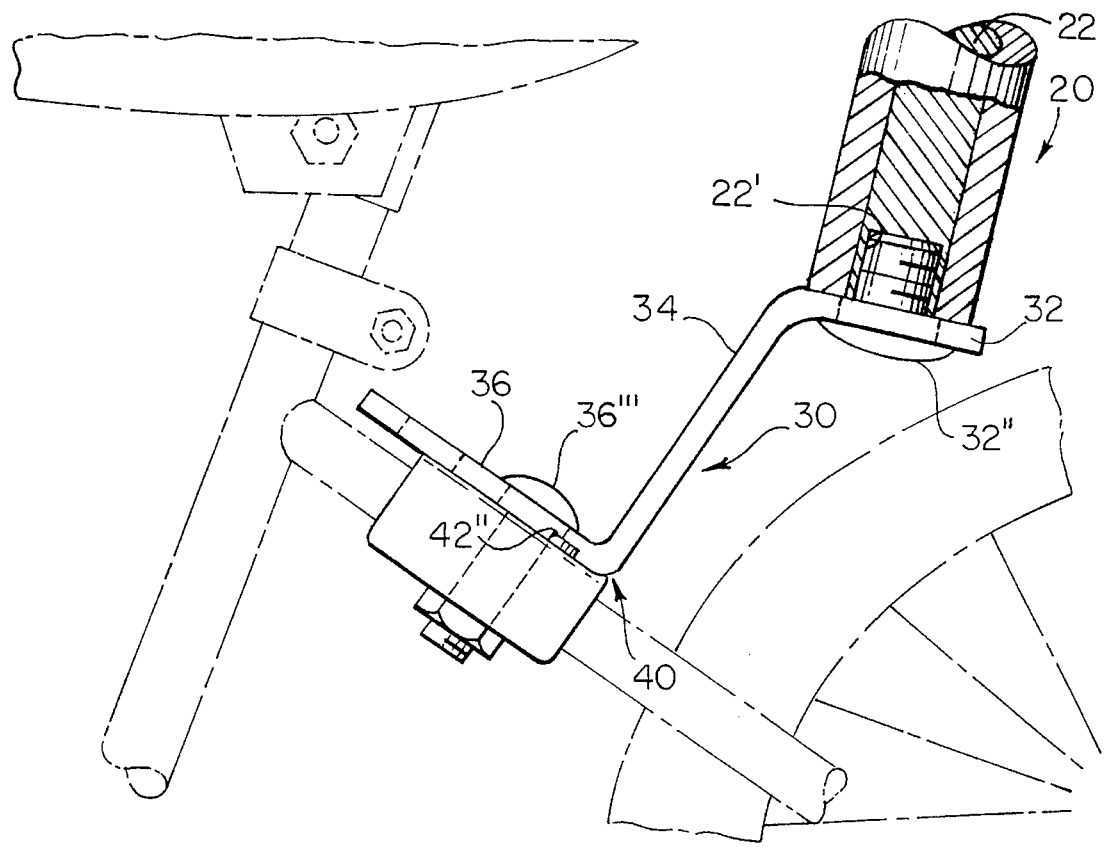
FIG. 2 is an enlarged partial view in side elevation of the FIG. 1 configuration, the unit being applied to an A-frame bike rear upper fork.
Figure 3:
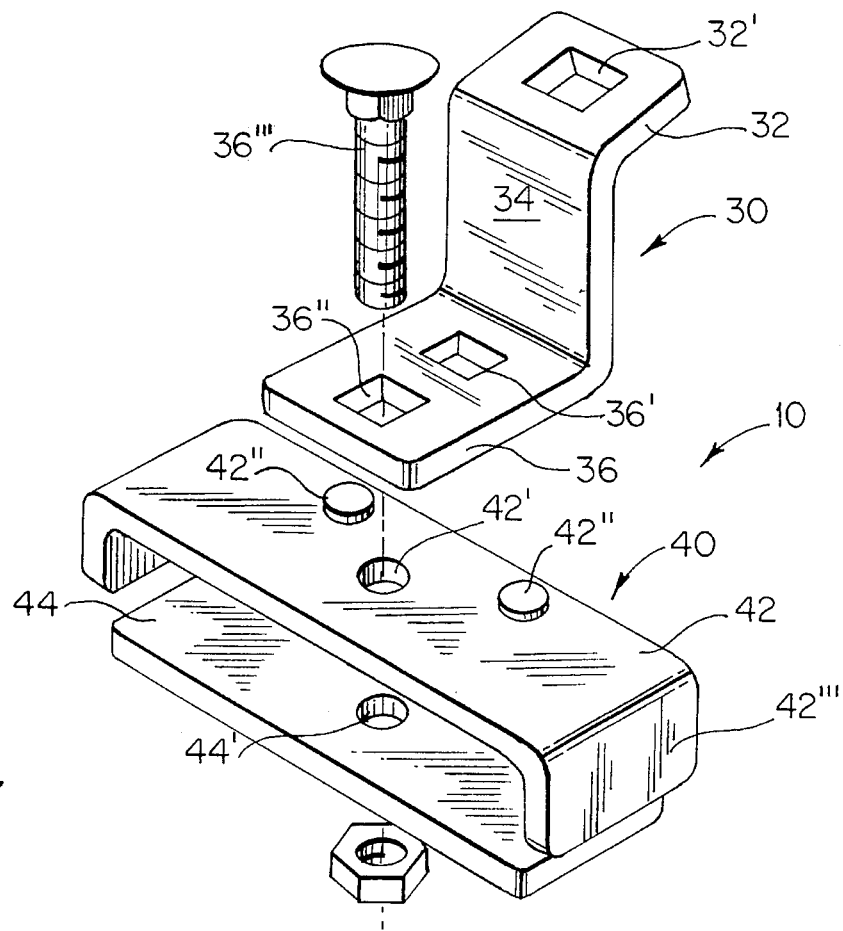
FIG. 3 is a view in perspective of the FIGS. 1 & 2 clamp assembly.

BIKE STICK (™) unit 10 is an assembly which comprises a flexpole 20, intermediate anchor plate 30, with bolts and changing assembly 40.

The flexpole 20 has an anchor end wherein a rigid rod-like solid insert 22 is plastic welded into the lower portion of the pole and this insert has a threaded seat 22' for an anchor carriage bolt 32". Intermediate segment 24 terminates in upper end 26 to which is friction filled a handle sleeve 28, capped at 28' to enclose the pole end. Flexpole 20 may be compared to a PVC tube, which is open at both ends, the lower end providing a threaded housing for the anchor carriage bolt, defined hereinafter.

Upper connector plate 30 defines an inclined rearward ledge segment 32, an upright, intermediate elevating segment 34 with flat lower segment 36 which together provide elevation to inclined ledge 32 to clear the bike caliper brakes while avoiding interference with bike seat and/or rear tire. This first segment 32 defines bore 32' which seats carriage bolt 32" therein for anchorage to the flex pole. An oversized washer may prevent abrasion of the PVC tube against upper plate shelf 32. The flat lower segment 36 is at a right angle to segment 34 and extends forwardly thereupon. It defines two front and rear bores 36' and 36" which adjustably seat the carriage bolt assembly 36''' which includes a nut.

Clamping assembly 40 includes middle plate 42 and bottom plate 44. A central bolt apertures 42'–44' are aligned to receive bolt 36''' as shown. On the top surface of plate 42 are a pair of laterally disposed half shears 42" to engage sides of the lower most segment of the connector plates preventing rotation of contiguous segment 36 thereon. In lieu of the half-shears, one may simple provide protuberances in the form of parallel ridges, not shown. Laterally depending legs 42''' will retain the bottom plate and provide a restorative housing to guard against displacement of the entire unit 10 on the bike frame. Carriage bolt 36''' is compressibly fitted to assemblies 30 and 40 by means of the bolt assembly nut which engages the lower surface of plate 44 beneath the aperture 44' thereof. It is significant that the apertures 32', 36' and 36" be polygonal in cross section to preclude slippage of the bolts in their corresponding seats.

Characteristically, the disposition of the extension pole stabilizer unit 10 relative to the frame, the bike seat and the wheel of the vehicle, is such that the balancing unit is most effectively disposed relative to the mean center of gravity of the bike when it is occupied and being used. Whereas the center of gravity will shift upon acceleration and the change in vehicle pitch, the location of the BIKE STICK (™) unit close to the mean center of gravity suffices. The flexibility of the pole is such that it allows the child rider limited freedom of motion to balance, without giving up one's grip on the pole.

Whereas the invention has been described with specific reference to the drawings, various modifications may be made without departing from the spirit of the invention, defined in the annexed claims.

I claim:

1. A bicycle stabilizing training apparatus, for use on a bicycle having a front end and a rear end and having a frame including a front wheel having an axle and a rear wheel having an axle, and further including a seat and a seat supporting member and a rear wheel mounting fork extending from said seat supporting member to said axle of said rear wheel, and having a combined center of gravity when mounted by a bicycle rider, comprising an elongate balancing pole member comprising a pole member first end for mounting to said bicycle frame and a pole member second end adapted to be gripped as a handle, said pole member being adapted to function as a lever for a trainer behind said bicycle to grasp and hold and thereby to support, propel, balance and stop said bicycle, and to release and re-grab said handle and recover balance for allowing the rider to test his or her riding ability without falling, pole member mounting means adapted to secure said pole member to said rear wheel mounting fork adjacent said seat supporting member, such that said pole member mounting means is located near said combined center of gravity for creating a maximum moment at said pole member second end about said combined center of gravity, wherein said pole member is tilted toward said rear end of said bicycle and extends to a point behind said axle of said rear wheel to permit said trainer improved access to said pole member, wherein said pole member mounting means comprises an adjustable anchor clamp engaging said rear wheel mounting fork to support said pole member, said anchor clamp comprising opposed upper and lower anchor plates having fastening means urging them into compression contact with said rear wheel mounting fork, a connector plate joining said anchor clamp and said first end of said pole member, said connector plate having connector plate fastening means securing said connector plate to said pole member, wherein said connector plate defines a topmost rearwardly inclined ledge segment, an elevating segment extending below said ledge segment and a forwardly extending lowermost segment, wherein said inclined ledge segment provides a perpendicular contact for said pole member, said elevating segment spacing said pole member apart from said bicycle frame, said lowermost segment providing means for positioning of said connector plate on the anchor clamp, wherein said upper anchor plate exceeds said lower anchor plate in lateral dimension and has leg portions depending therefrom, said leg portions providing a retaining structure for said lower plate, whereby to confine said lower plate against displacement relative to said upper anchor plate and to confine said mounting fork to prevent lateral displacement of said anchor plate relative to said frame.

* * * * *